May 23, 1933. H. B. BABSON 1,910,666
PARTITION FOR COW STALLS
Filed May 1, 1930
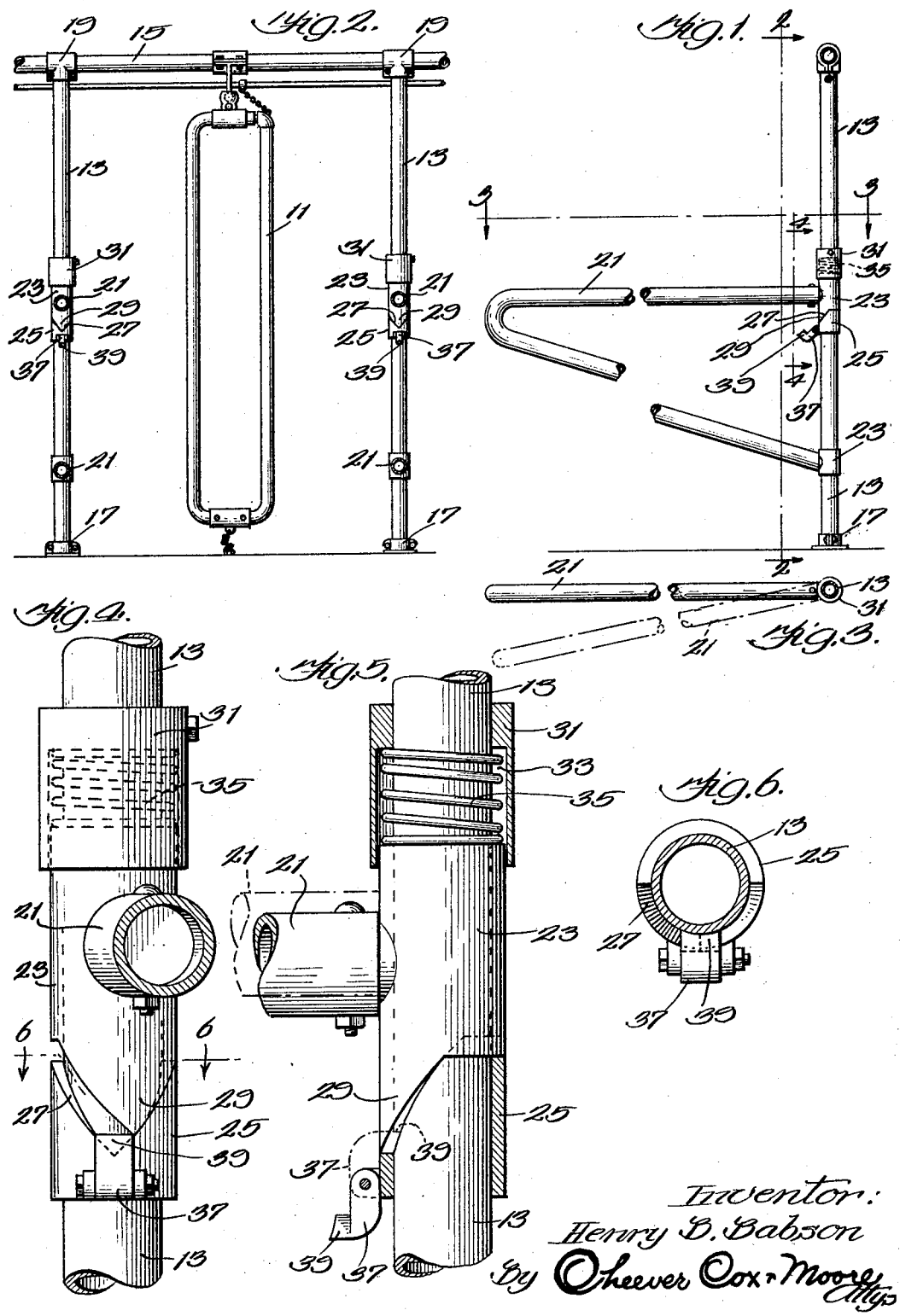

Patented May 23, 1933

1,910,666

UNITED STATES PATENT OFFICE

HENRY B. BABSON, OF CHICAGO, ILLINOIS, ASSIGNOR TO BABSON MANUFACTURING CORPORATION, OF CHICAGO, ILLINOIS, A CORPORATION OF ILLINOIS

PARTITION FOR COW STALLS

Application filed May 1, 1930. Serial No. 448,889.

My invention relates in general to cow stalls and has more particular reference to a partition for a cow stall.

One important object of my invention is to provide a yielding partition of unusual compactness which if pushed side ways by the occupant of the stall will press against the sides of the cow with increasing pressure the further it is pushed so that the cow will be urged back to proper alignment in the stall.

By moving the partition of my invention, stalls may be placed more closely together and space thus conserved because as soon as the cow steps side wise out of position, it contacts the partition and is urged back into place.

Another object is to provide a shiftable partition which normally returns to central position when shifted therefrom, but which can be locked in shifted position when desired, in order that space can be created at the side of the stall to facilitate milking operations.

These and other objects will be more fully appreciated when the invention is understood from the following description, which taken in connection with the accompanying drawing discloses a preferred embodiment of my invention.

Referring to the drawing:

Figure 1 is a side elevation of a cow stanchion having a partition embodying my present invention;

Figure 2 is a vertical cross section taken substantially along the line 2—2 in Figure 1;

Figure 3 is a horizontal cross section taken substantially along the lines 3—3 in Figure 1;

Figure 4 is a vertical cross section taken substantially along the line 4—4 in Figure 1; and illustrates the partition locked in shifted position;

Figure 5 is a side view of the assembly shown in Figure 4, parts of the device being shown in cross section to reveal details of the construction; and Figure 6 is a horizontal cross section taken substantially along the lines 6—6 in Figure 4.

To illustrate my invention, I have shown on the drawing an animal stall, including a stanchion 11 and support frame for the stanchion including spaced apart uprights 13 and a cross connection 15. The uprights 13 are or may be secured at their lower ends in the floor of the stable by any suitable means as for instance by the brackets 17 illustrated. The uprights 13 are all or may be secured at their upper ends to the cross piece 15 by clamps 19, or any other suitable connecting means. In the illustrated embodiment the stanchion 11 is supported from the cross piece 15.

To divide adjacent stalls, I provide partitions each comprising a member 21, which I prefer to form from a single length of metal tubing and pivotally and resiliently support one of these partitions on each of the uprights 13. In order to accomplish this, the partition members 21 are provided with bushings 23, which rotatably embrace the uprights 13. These bushings may be conveniently mounted to the partitions 21 in any suitable or convenient manner, as for instance by connecting the bushings to the ends of the pieces of bent tubing so that the partitions 21 will be pivotally mounted to the uprights 13. In order to sustain the partitions at the proper altitude from the stable floor, and in order to resiliently support same in a pre-determined position, that is to say, extending in a plane normal to the plane of the uprights 13, I provide on each upright 13 a collar 25 which is secured to the upright immediately below one of the bushings 23. The collar 25 is provided with a V-shaped notch 27 and the bushing 23h as a corresponding V-shaped projection 29, which is normally adapted to fit in the notch 27. The sides of the notch 27 and the edges of the projection 29 are slightly curved so that when the partition 21 is shifted out of its normal position, the cam action between curved sides of the notch and the corresponding curved edge of the projection will raise the partition 21, the bushings 23 sliding axially along the support upright 13. It will be understood that in order thus to raise the partition, considerable force must be exerted in a side wise direction against the partition, and that the weight of the partition will, on account of the cam action between the projection 29 and the notch 27, urge the partition toward its neutral position whenever the same is displaced therefrom.

However, to increase this effect, I mount a collar 31 to the upright 13 above one of the bushings 23 and provide the collar with a recess 33 in which to house a spring 35, one end of which bears against the bottom of the recess 33 and the other end of which bears against the upper end of the collar so that when the partition 21 is displaced as aforesaid and the bushing 23 moves axially upwardly along the support upright 13, the spring 35 will be compressed and will continuously, with ever increasing force, urge the bushing downwardly so that the partition will be urged to return to normal central position, i. e., the position in which it extends at right angles to the common plane of the uprights 13.

In order to latch the partition in shifted position so that it will not be urged to return to central position, it being desirable to so latch the partition when the animal occupying the stall is being given attention, I provide a form of dog 37 comprising a shank, one end of which is pivotally mounted as at 39 to the collar 25 immediately below the bottom of the notch 27. The shank of the dog 37 is provided in its upper end with a triangular portion 39 adapted, when the dog is in latching position to enter the lower portions of the notch 27 and to provide a stop for supporting the projection 29 in raised position as shown clearly in Figure 4 of the drawing. Since the turning effect, which urges the partition to assume a normal pre-determined position is accomplished solely by the co-operation of the weight of the partition increased by the effect of the spring 35, together with the cam action of the co-operating cam 27 and cam follower 29, the dog 37 when in latching position will support the partition in any desired shifted position.

It is thought that the invention and numerous of its attendant advantages will be fully understood from the foregoing description, and it is obvious that numerous changes may be made in the form, construction and arrangement of the numerous parts without departing from the spirit of my invention or sacrificing any of its attendant advantages, the form hereinbefore described being a preferred embodiment for the purpose of illustrating my invention.

Having thus described my invention what I claim as new and desire to secure by Letters Patent is:

1. In an animal stall, the combination of an upright, a partition member pivotally mounted to swing on said upright and means normally urging said partition to assume a predetermined relative angular position with respect to said upright, said means comprising a bushing having a projection at its lower end and a collar having a notch to receive said projection and means entering the notch and co-operating with the projection to hold the partition in another position than the predetermined relative angular position aforesaid.

2. In an animal stall, the combination of an upright, a partition member pivotally mounted to swing on said upright and means normally urging said partition to assume a predetermined relative angular position with respect to said upright, said means comprising a bushing having a projection at its lower end and a collar having a notch to receive said projection and a member shiftably mounted on the upright and having a latch portion adapted to swing into and out of the notch, said latch portion being adapted to co-operate with the projection in said notch to secure the partition in shifted position.

3. In an animal stall, the combination of an upright, a partition member pivotally mounted to swing on said upright and means normally urging said partition to assume a pre-determined relative angular position with respect to said upright, said means comprising a bushing having a projection and a collar having a notch to receive said projection and means entering the notch and co-operating with the projection to hold the partition in another position than the pre-determined relative angular position aforesaid.

4. Apparatus as set forth in claim 3 including resilient means normally urging the bushing toward the collar whereby to resiliently urge the projection into cooperative relationship with the notch.

5. Apparatus as set forth in claim 3 including a helical spring mounted on and encircling the upright and having a portion engaging and normally urging said bushing toward the collar.

In witness whereof, I have hereunto subscribed my name.

HENRY B. BABSON.